(12) United States Patent
Hu

(10) Patent No.: US 9,848,450 B2
(45) Date of Patent: *Dec. 19, 2017

(54) METHOD, SYSTEM AND DEVICE FOR RECOVERING INVALID DOWNLINK DATA TUNNEL BETWEEN NETWORKS

(71) Applicant: Huawei Technologies Co., Ltd., Shenzhen, Guangdong (CN)

(72) Inventor: Weihua Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,133

(22) Filed: Sep. 11, 2014

(65) Prior Publication Data

US 2014/0376506 A1    Dec. 25, 2014

Related U.S. Application Data

(63) Continuation of application No. 13/357,366, filed on Jan. 24, 2012, now Pat. No. 8,867,339, which is a
(Continued)

(30) Foreign Application Priority Data

Aug. 15, 2006  (CN) .......................... 2006 1 0115276

(51) Int. Cl.
*H04W 76/02* (2009.01)
*H04L 12/46* (2006.01)
*H04L 29/14* (2006.01)

(52) U.S. Cl.
CPC ....... *H04W 76/021* (2013.01); *H04L 12/4633* (2013.01); *H04W 76/022* (2013.01); *H04W 76/028* (2013.01); *H04L 69/40* (2013.01)

(58) Field of Classification Search
None
See application file for complete search history.

(56) References Cited

U.S. PATENT DOCUMENTS 6,574,266 B1    6/2003   Haartsen
7,054,945 B2    5/2006   Hurtta et al.
(Continued)

FOREIGN PATENT DOCUMENTS

CN    1659908 A    8/2005
CN    1671119 A    9/2005
(Continued)

OTHER PUBLICATIONS

Nokia, "SGSN Controlled Bearer Optimization; Impacts to Nodes and Interfaces," 3GPP TSG SA WG2 Architecture, S2#52, S2-061417, May 2006, Shanghai, China, pp. 1-4.*
(Continued)

*Primary Examiner* — Donald Mills
(74) *Attorney, Agent, or Firm* — Huawei Technologies Co., Ltd.

(57) ABSTRACT

Described herein is a method for processing an invalidation of a downlink data tunnel between networks. The method includes the following steps: (1) a core network user plane anchor receives an error indication of data tunnel sent from an access network device, (2) after deciding that the user plane corresponding to the error indication uses a One Tunnel technology, the core network user plane anchor notifies a relevant core network control plane to request recovering the downlink data tunnel, (3) the core network control plane recovers the downlink data tunnel and notifies the core network user plane anchor to update information of the user plane. In addition, a communication system and a communication device are also provided. The method, sys-
(Continued)

tem, and device can improve the speed of recovering data transmission after the downlink data tunnel becomes invalid.

12 Claims, 6 Drawing Sheets

Related U.S. Application Data continuation of application No. 12/369,431, filed on Feb. 11, 2009, now Pat. No. 8,125,889, which is a continuation of application No. PCT/CN2007/070475, filed on Aug. 14, 2007.

(56) References Cited

U.S. PATENT DOCUMENTS

| | | | |
|---|---|---|---|
| 7,869,393 B2* | 1/2011 | Maxwell | H04W 88/16 370/218 |
| 8,125,889 B2 | 2/2012 | Hu | |
| 8,218,535 B1 | 7/2012 | Hurtta et al. | |
| 8,867,339 B2 | 10/2014 | Hu | |
| 2002/0006114 A1 | 1/2002 | Bjelland et al. | |
| 2003/0013446 A1* | 1/2003 | Haumont et al. | 455/436 |
| 2003/0021256 A1 | 1/2003 | Lee | |
| 2003/0186692 A1* | 10/2003 | Tamura | 455/422.1 |
| 2003/0224794 A1* | 12/2003 | Kim | H04L 12/189 455/445 |
| 2005/0172012 A1 | 8/2005 | Casati | |
| 2007/0268855 A1 | 11/2007 | Grayson et al. | |
| 2008/0186912 A1 | 8/2008 | Huomo | |
| 2010/0046362 A1 | 2/2010 | Zhu et al. | |
| 2010/0061386 A1 | 3/2010 | Olsson et al. | |

FOREIGN PATENT DOCUMENTS

| WO | 03105493 A2 | 12/2003 |
|---|---|---|
| WO | 2008080717 A1 | 7/2008 |

OTHER PUBLICATIONS

3GPP TS 23.060 V7.3.0; 3rd Generation Partnership Project; Technical Specification Group Services and System Aspects; General Packet Radio Service (GPRS); Service description; Stage 2 (Release 7); Dec. 2006; total 214 pages.
Huawei; One Solution to Error Indication for SGSN controlled bearer optimisation; 3GPP TSG SA WG2 Architecture—S2#54; S2-062756; Aug. 28-Sep. 1, 2006; Sophia Antipolis, France; total 6 pages.
3GPP TR 23.882 V0.8.0; 3rd Generation Partnership Project; Technical Specification Group Services and System Aspects; 3GPP System Architecture Evolution: Report on Technical Options and Conclusions (Release 7); Nov. 2005; total 65 pages.
3GPP TR 23.809 V0.3.0; 3rd Generation Partnership Project; Technical Specification Group Services and System Aspects; One Tunnel Functional description; (Release 7); Jul. 2006; total 36 pages.
3GPP TS 23.007 V7.0.0; 3rd Generation Partnership Project; Technical Specification Group Core Network; Restoration procedures (Release 7); Jun. 2006; total 21 pages.
3GPP TS 29.060 V7.2.0; 3rd Generation Partnership Project; Technical Specification Group Core Netowrk and Terminals; General Packet Radio Service (GPRS); GPRS Tunnelling Protocol (GTP) across the Gn and Gp interface (Release 7); Jun. 2006; total 135 pages.
3GPP TS 23.060 V7.1.0, 3rd Generation Partnership Project; Technical Specification Group Services and System Aspects; General Packet Radio Service (GPRS); Service description Stage 2 (Release 7), Jun. 2006, total 213 pages.
3GPP TSG SA WG2 Architecture—S2 #53 S2-062136, "GGSN without One Tunnel Support", ZTE, China Mobile, Jun. 26-30, 2006, total 3 pages.

3GPP TSG SA WG2 Architecture—S2 #53 S2-062367 (Revised from S2-062136), "GGSN without One Tunnel Support", ZTE, China Mobile, Jun. 26-30, 2006, total 3 pages.
3GPP TSG SA WG2 Architecture—S2 #53 S2-062513 (Revised from S2-062367, Revised from S2-062136), "GGSN without One Tunnel Support", ZTE, China Mobile, Jun. 26-30, 2006, total 5 pages.
3GPP TSG SA WG2 Architecture—S2 #53 S2-062552 (Revised from S2-062513, Revised from S2-062367, Revised from S2-062136), "GGSN without One Tunnel Support", ZTE, China Mobile, Jun. 26-30, 2006, total 5 pages.
3GPP TSG SA WG2 Architecture—S2#53 S2-062554, "Impacts to Functions and Characteristics", Ericsson, Jun. 26-30, total 12 pages.
3GPP TSG SA WG2 Architecture—S2#53 S2-062308, "Impacts to Functions and Characteristics", Ericsson, Jun. 26-30, 2006, total 12 pages.
3GPP TSG SA WG2 Architecture—S2#53 S2-062451, "Impacts to Functions and Characteristics", Ericsson, Jun. 26-30, 2006, total 12 pages.
File History of U.S. Pat. No. 8,867,339 (U.S. Appl. No. 13/357,366, filed Jan. 24, 2012). Total 176 pages.
Declaration of Mark R. Lanning and CV, dated Jan. 9, 2017, submitted in Inter Partes Review Case: IPR2017-00588. Total 131 pages.
Declaration of Balazs Bertenyi, dated Jan. 10, 2017, submitted in Inter Partes Review Case: IPR2017-00588. Total 19 pages.
3GPP TR 23.809 V0.3.0, 3rd Generation Partnership Project; Technical Specification Group Services and System Aspects; One Tunnel Functional description; (Release 7). Jul. 2006. Total 36 pages.
SA WG2 Temporary Document, 3GPP TSG SA WG2 Architecture—S2#53, S2-062308, "Impacts to Functions and Characteristics," Ericsson, Lisbon, Portugal, Jun. 26-30, 2006. Total 11 pages.
3GPP TR 23.873 V4.0.0 (Mar. 2001), 3rd Generation Partnership Project (3GPP), Technical Specification Group Services and System Aspects, Feasibility Study for Transport and Control Separation in the PS CN Domain (Release 4). Mar. 2001. Total 91 pages.
3GPP TS 23.060 V7.1.0, 3rd Generation Partnership Project; Technical Specification Group Services and System Aspects; General Packet Radio Service (GPRS); Service description; Stage 2 (Release 7). Jun. 2006. Total 213 pages.
3GPP TS 23.060 V5.0.0, 3rd Generation Partnership Project; Technical Specification Group Services and System Aspects; General Packet Radio Service (GPRS); Service description; Stage 2 (Release 5). Jan. 2001. Total 198 pages.
File History of U.S. Pat. No. 8,125,889 (U.S. Appl. No. 12/369,431, filed Feb. 11, 2009). Total 353 pages.
About 3GPP Home, 3GPP: A Global Initiative, available at http://www.3gpp.org/about-3gpp/about-3gpp. Printed on Sep. 22, 2016. Total 4 pages.
3GPP FAQs, 3GPP: A Global Initiative, available at http://www.3gpp.org/contact/3gpp-faqs. Printed on Sep. 22, 2016. Total 10 pages.
Delegates Corner, 3GPP: A Global Initiative, available at http://www.3gpp.org/specifications-groups/delegates-corner. Printed on Sep. 22, 2016. Total 5 pages.
Working Procedures, 3GPP: A Global Initiative, available at http://www.3gpp.org/specifications-groups/working-procedures. Printed on Sep. 22, 2016. Total 5 pages.
Complaint filed on Jan. 15, 2016 in *Huawei Tech. Co., Ltd.* v. *T-Mobile US, Inc.*, Case 2:16-cv-00052-JRG-RSP, Paper 1 (E.D. Texas). Total 31 pages.
Joint Claim Construction and Preheating Statement filed on Dec. 9, 2016 in *Huawei Tech. Co., Ltd.* v. *T-Mobile US, Inc.*, Case 2:16-cv-00052-JRG-RSP, Paper 110 (E.D. Texas). Total 35 pages.
Petition for Inter Partes Review Under 35 U.S.C. § 312 and 37 C.F.R. § 42.104, for U.S. Pat. No. 8,867,339, filed by Nokia Solutions and Networks, Case: IPR2017-00588. Jan. 10, 2017. Total 85 pages.
3GPP TS 21.900 V6.0.0 (Sep. 2003), 3rd Generation Partnership Project; Technical Specification Group Services and System Aspects; Technical Specification Group working methods (Release 5). Sep. 2003. Total 33 pages.

(56) References Cited

OTHER PUBLICATIONS

T-Mobile US, Inc. and Nokia Solutions and Networks Invalidity Contentions, filed Aug. 11, 2016 in Civil Action No. 2:16-cv-00052-JRG-RSP (E.D. Texas). Total 193 pages.
Exhibit D-1, Claim Chart filed with T-Mobile Invalidity Contentions (16-cv-00052). Aug. 11, 2016. Total 224 pages.
Exhibit D-2, Claim Chart filed with T-Mobile Invalidity Contentions (16-cv-00052). Aug. 11, 2016. Total 104 pages.
3GPP TR 23.873 V.4.0.0, 3rd Generation Partnership Project (3GPP); Technical Specification Group Services and System Aspects; Feasibility Study for Transport and Control Separation in the PS CN Domain (Release 4), Mar. 2001, total 96 pages.
3GPP TSG SA WG2 Architecture-S2#53 S2-062200,"SGSN controlled bearer optimisation; uploads on clause 6", Nokia, Jun. 26-30, 2006, total 15 pages.
3GPP TSG SA Tdoc S2S-000096, "SGSN server-PS-MGW approach, how to handle abnormal cases", Ericsson, Oct. 17-19, 2000, total 4 pages.
IPR2017-00588, Exhibit 2001, *Nokia v. Huawei*, Apr. 11, 2017. total 1 page.
IPR2017-00588, Patent Owner Huawei Technologies' Preliminary Response, *Nokia v. Huawei*, Apr. 27, 2017. total 49 pages.
"Scheduling Order", Case IPR2017-00588; U.S. Pat. No. 8,867,339 B2, Jul. 26, 2017, total 10 pages.
Decision-Institution of Inter Partes Review, Case IPR2017-00588; U.S. Pat. No. 8,867,339 B2, Jul. 26, 2017, total 20 pages.

\* cited by examiner

METHOD, SYSTEM AND DEVICE FOR RECOVERING INVALID DOWNLINK DATA TUNNEL BETWEEN NETWORKS

CROSS-REFERENCE TO RELATED APPLICATIONS

This application is a continuation of U.S. patent application Ser. No. 13/357,366, filed on Jan. 24, 2012, which is a continuation of U.S. patent application Ser. No. 12/369,431 (now U.S. Pat. No. 8,125,889), filed on Feb. 11, 2009, which is a continuation of International Application No. PCT/CN2007/070475, filed Aug. 14, 2007, which claims priority to Chinese Patent Application No. 200610115276.X, filed on Aug. 15, 2006. All of the foregoing applications are hereby incorporated by reference in their entireties herein.

FIELD OF THE INVENTION

The present invention relates to a mobile communication technology, and more particularly to a method, system, and device for recovering an invalid downlink data tunnel for a user plane between an access network and a core network, having a One Tunnel/Direct Tunnel architecture in a third generation mobile communication system.

BACKGROUND

As the high speed packet access (HSPA) and Internet protocol (IP) multimedia subsystem (IMS) are introduced into a 3rd Generation Partnership Project (3GPP) network, it is expected that the user plane data traffic will significantly increase in the coming several years. In order to improve data transmission performance of the 3GPP system and reduce the costs of network investment by the operator, the 3GPP organization has researched a network architecture called One Tunnel, which is referred to as "One Tunnel" or "Direct Tunnel" network architecture in the specification (briefly called One Tunnel). Particularly, a user plane tunnel is directly established between a radio network control (RNC) and a gateway general packet radio service (GPRS) support node (GGSN) to replace the existing two tunnels respectively between the RNC and a serving GPRS support node (SGSN) and between the SGSN and the GGSN to strip the user plane function from the SGSN node, so as to save the operator's investment on the capacity expansion of the SGSN user plane in order to cater to the traffic growth of a network user plane caused by the HSPA. In brief, the One Tunnel architecture may be generalized as a flattening of user plane levels, in which the core network retains one layer of user plane node and one tunnel is established between the access network and a user plane entity of the core network.

In the 3GPP system, the data transmission between the access network and the core network user plane uses a GPRS tunnel protocol (GTP) technology. When one end of a GTP tunnel receives a packet data sent from a peer end, the peer end locates a user plane context according to tunnel end identity (TEID) information carried in a GTP header in an external layer of the packet data and then forwards the data according to routing information stored in the context. If a node at one end of the GTP tunnel may release the user plane context due to node reset or other abnormal circumstances, once receiving the data sent from the peer end of the GTP tunnel, the node cannot locate the corresponding user plane context or forward the received packet data normally, and therefore, merely discards the received data. According to the requirements of the GTP protocol, if the GTP data packet is received but the user plane context cannot be located, an error indication message needs to be sent to the peer end while the data packet is discarded, so as to notify the peer end that the tunnel is invalid and not to send data via the current tunnel any more.

In the One Tunnel architecture, the user plane has only one data tunnel established between the RNC and the GGSN. Once the RNC releases air interface resources and context of the user due to abnormal circumstances such as reset, a relevant downlink data tunnel between the relevant RNC and the GGSN becomes invalid. If the GGSN delivers a data to the RNC via the invalid downlink data tunnel, the GGSN inevitably receives an error indication message, i.e., an error indication, returned from the RNC. According to the current processing mechanism, in this case, the GGSN deactivates a packet data protocol (PDP) context to release the entire IP bearer. If a user wants to recover the data transmission later, the user must reactivate the PDP to establish the IP bearer.

In the above system, after the invalidation of the downlink data tunnel between the RNC and the GGSN, the user has to reactivate the PDP to establish the IP bearer once again to recover the data transmission. Such reactivation operation inevitably affects the speed of the data transmission recovery and causes the affected users to appear offline, which is undesirable in the 3GPP systems. In addition, reactivation of the PDP cannot ensure the IP address of the IP bearer unchanged, and the application based on the 3GPP network is therefore easily interrupted due to the change of the IP address.

SUMMARY

In an embodiment, the present invention is directed to a method for processing an invalidation of a downlink data tunnel between networks, which is capable of improving the speed of recovering a data transmission after the downlink data tunnel becomes invalid.

In an embodiment, the present invention is directed to a communication system, which is capable of improving the speed of recovering a data transmission after the downlink data tunnel becomes invalid.

In an embodiment, the present invention is directed to a communication device, which is capable of improving the speed of recovering a data transmission after the downlink data tunnel becomes invalid.

The technical solutions of the embodiments of the present invention are realized as follows.

One aspect of the present invention provides a processing method on an invalidation of a downlink data tunnel between networks, which includes the following steps: (1) receiving, by a core network user plane anchor, an error indication of data tunnel from an access network device; and (2) notifying a core network control plane to recover a downlink data tunnel if a user plane corresponding to the error indication uses a One Tunnel technology.

Other aspect of the present invention provides a communication system, which includes a core network control plane and a core network user plane anchor. The core network user plane anchor is adapted to receive an error indication of data tunnel from an access network device and notify the core network control plane to request recovering the downlink data tunnel after determining that the user plane corresponding to the error indication uses a One Tunnel technology. The core network control plane is adapted to recover the downlink data tunnel after receiving a notification sent by the core network user plane anchor.

Another aspect of the present invention provides a communication device. The device includes a receiving unit and a sending unit. The receiving unit is adapted to receive an error indication of data tunnel from an access network device. The sending unit is adapted to notify a core network control plane to recover a downlink data tunnel if a user plane corresponding to the error indication uses a One Tunnel technology.

Yet another aspect of the present invention provides a communication device. The device includes a receiving unit and a sending unit. The receiving unit is configured to receive a notification from a core network user plane anchor to recover a downlink data tunnel if a user plane using a One Tunnel technology is error. The sending unit is configured to send a radio access bearer (RAB) assignment request to an access network device, the RAB assignment request carrying a user plane Internet protocol (IP) address and tunnel end identity (TEID) information allocated by the core network user plane anchor for receiving uplink data.

According the technical solutions of the embodiments of the present invention, the core network user plane anchor receives the error indication of data tunnel from a access network device, and notifies a relevant core network control plane to request recovering the downlink data tunnel after determining that the user plane corresponding to the error indication uses the One Tunnel technology. The core network control plane recovers the downlink data tunnel and notifies the core network user plane anchor to update information of the user plane. Once the downlink data tunnel becomes invalid, the core network user plane anchor does not release the corresponding PDP context and notifies the core network control plane to reestablish the downlink data tunnel. Such operation improves the speed of recovering data transmission after the downlink data tunnel becomes invalid and avoids negative influences on the data transmission recovery caused by reactivation of the PDP.

BRIEF DESCRIPTION OF THE DRAWINGS

Embodiments of the present invention will become more fully understood from the detailed description given herein below for illustration only, which thus is not limitative of the present invention, and wherein.

DETAILED DESCRIPTION

In order to make the objectives, technical solutions, and advantages of the present invention comprehensible, the present invention is described in detail below with reference to the accompanying drawings.

In the embodiments of the present invention, a core network user plane anchor receives an error indication of data tunnel from an access network device and notifies a relevant core network control plane to recover the downlink data tunnel after determining that the user plane corresponding to the error indication uses a One Tunnel technology; and the core network control plane recovers the downlink data tunnel and notifies the core network user plane anchor to update information of the user plane.

Embodiments of the present invention may be applied to an existing 3GPP system and an evolving 3GPP system.

Figure 1:
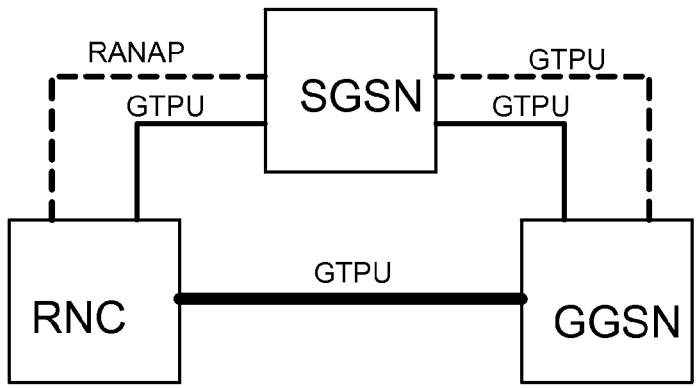
FIG. 1 is a schematic view of a One Tunnel architecture.

The One Tunnel technology involved in the existing 3GPP system includes two schemes. According to one scheme, an SGSN retains the user plane function. For example, in the scenario of a roaming user, prepaid user, or the like, in order to reduce the changes made to the core network user plane anchor, i.e., a GGSN, the user plane is continued to be established in a conventional manner, instead of the One Tunnel manner. FIG. 1 is a schematic view of a One Tunnel architecture in the existing systems. As shown in FIG. 1, a large part of the user plane traffic is directly transmitted between an RNC and the GGSN via a tunnel using the One Tunnel technology, as indicated by the thick solid line in FIG. 1; and a small part of the user plane traffic is still transmitted between the RNC and the GGSN via the SGSN, as indicated by the thin solid line in FIG. 1 and the signaling interaction of the control plane is indicated by the dashed in FIG. 1. Hereinafter, this scheme is briefly called a One Tunnel scheme in which the SGSN retains the user plane function.

According to the other scheme of the One Tunnel technology, the SGSN does not have the user plane function, and the tunnel between the RNC and the GGSN is used to transmit data in all scenarios. If this scheme is adopted, the GTP user plane (GTPU) tunnel between the RNC, the SGSN, and the GGSN no longer exists. Hereinafter, this scheme is briefly called a complete One Tunnel scheme.

In the evolving 3GPP system, the realization of the One Tunnel technology is substantially similar to the above complete One Tunnel scheme, but is slightly different from the existing 3GPP system in certain specific entities. For example, the function of the core network control plane, i.e., the function realized by the SGSN in the above complete One Tunnel scheme is realized by a mobility management entity (MME), and the function of the above RNC is realized by an E-NodeB.

The solutions of embodiments of the present invention are illustrated in detail below through being applied to, for example, the existing 3GPP system.

Figure 2:
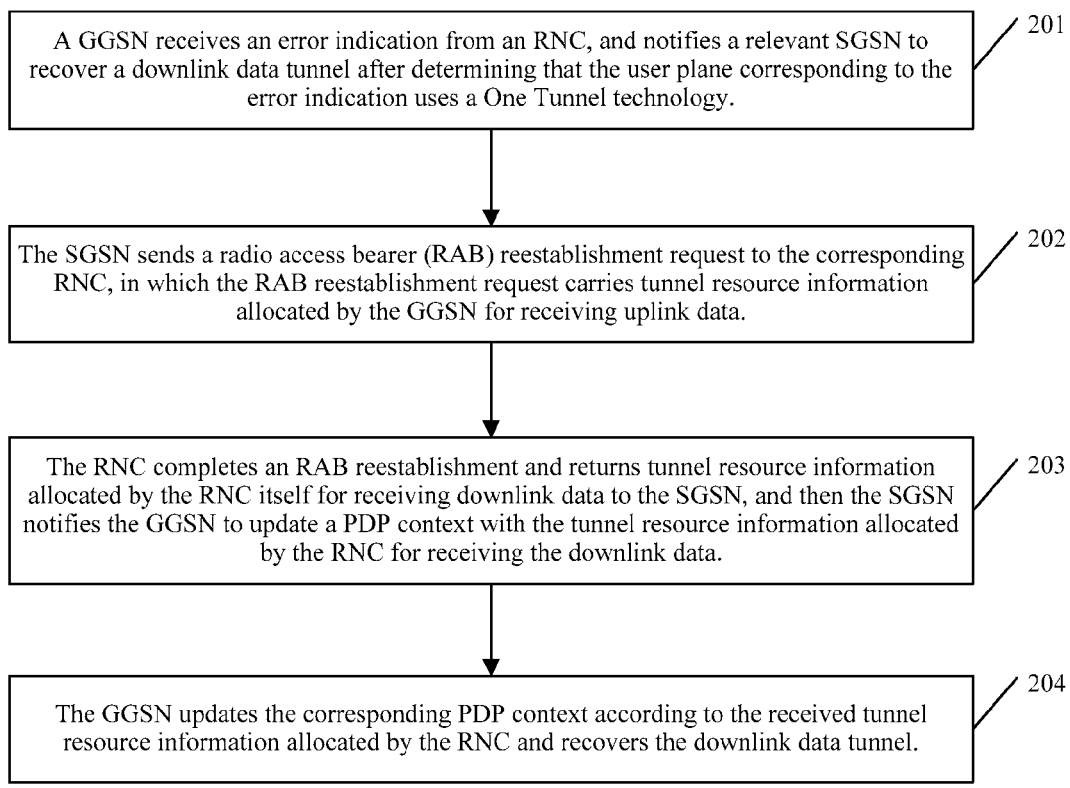
FIG. 2 is an overall flow chart of a method according to an embodiment of the present invention.

FIG. 2 is an overall flow chart of a method according to an embodiment of the present invention. As shown in FIG. 2, the method includes the following steps.

In Step 201, a GGSN receives an error indication from an RNC, and notifies a relevant SGSN to recover a downlink data tunnel after determining that the user plane corresponding to an error indication uses a One Tunnel technology.

In Step 202, the SGSN sends a radio access bearer (RAB) reestablishment request to the corresponding RNC, in which the RAB reestablishment request carries tunnel resource information allocated by the GGSN for receiving uplink data.

In Step 203, the RNC accomplishes an RAB reestablishment and returns tunnel resource information allocated by the RNC itself for receiving downlink data to the SGSN, and then the SGSN notifies the GGSN to update a PDP context through the tunnel resource information allocated by the RNC for receiving the downlink data.

In Step 204, the GGSN updates the corresponding PDP context according to the received tunnel resource information allocated by the RNC and recovers the downlink data tunnel.

Furthermore, during a process of activating the PDP context by the user, it determines whether the SGSN and the GGSN support the One Tunnel architecture or not, so as to decide whether to use the One Tunnel technology. If it decides to use the One Tunnel technology, the PDP context of the GGSN records that the One Tunnel technology is used.

In the above One Tunnel scheme in which the SGSN retains the user plane function, once the downlink data tunnel between the RNC and the GGSN is invalid, the GGSN may send a downlink data to the RNC via the SGSN before the downlink data tunnel between the GGSN and the RNC is recovered, so as to further improve the speed of recovering the downlink data transmission and lower the requirements on the data buffering function of the GGSN.

The above two One Tunnel schemes are respectively illustrated in detail below through preferred embodiments.

Figure 3:
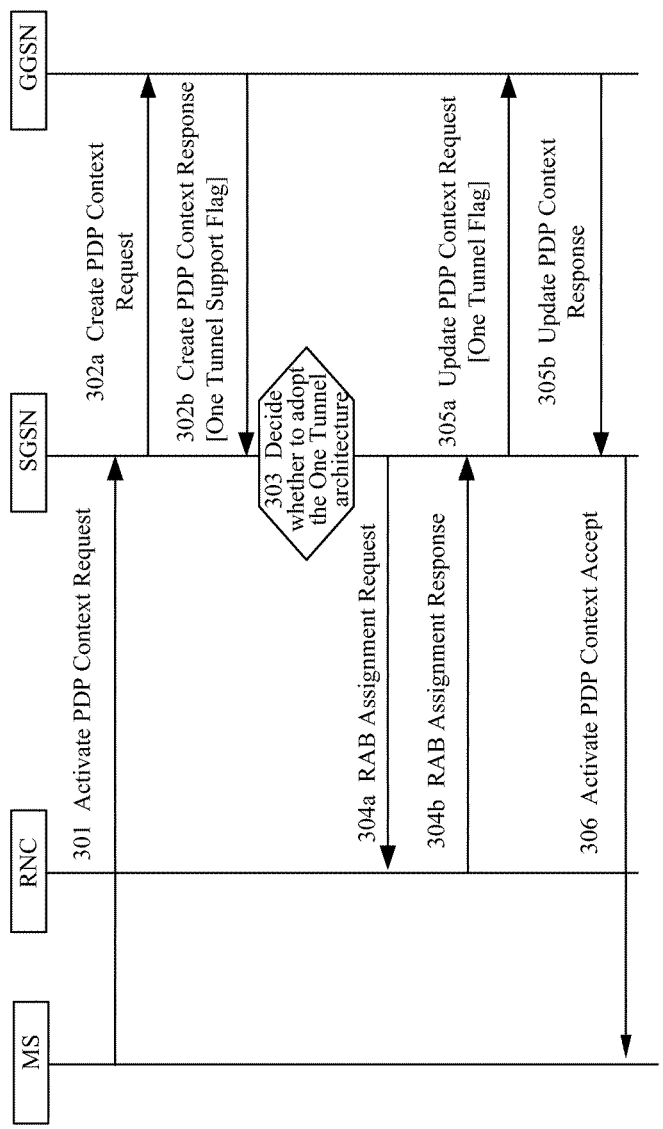
FIG. 3 is a flow chart of activating a PDP context by a user to establish an IP bearer in a method according to a first preferred embodiment of the present invention.

In the method according to a first preferred embodiment of the present invention, the One Tunnel scheme in which the SGSN retains the user plane function is adopted. FIG. 3 is a flow chart of activating a PDP context by a user to establish an IP bearer in a method according to a first preferred embodiment of the present invention. As shown in FIG. 3, the flow includes the following steps.

In Step 301, a mobile station (MS) sends an activate PDP context request to an SGSN.

In Step 302a, the SGSN selects a GGSN and sends a create PDP context request to the selected GGSN.

The create PDP context request carries a permanent ID of the MS, a mobile phone number, a quality of service (QoS) requested by the MS, an access point name (APN) requested to be activated, a user plane IP address and a GTP TEID allocated by the SGSN for receiving downlink data, as well as other information.

In Step 302b, the GGSN creates a PDP context and returns a create PDP context response message to the SGSN.

The create PDP context response message carries a negotiated QoS, a user plane IP address and a GTP TEID allocated by the GGSN for receiving uplink data, an indication for whether the GGSN supports the One Tunnel, as well as other information. The SGSN updates the corresponding PDP context according to the create PDP context response message returned by the GGSN.

In Step 303, the SGSN decides whether to adopt the One Tunnel architecture to establish a user plane or not according to subscription information, a roaming status of the user, a factor whether the GGSN supports the One Tunnel architecture, and the like.

In Step 304a, the SGSN delivers an RAB assignment request message to the RNC.

If the One Tunnel architecture is adopted, the RAB assignment request message carries the user plane IP address and the TEID information allocated by the GGSN for receiving uplink data. If the One Tunnel architecture is not adopted, a normal flow of establishing the user plane is performed, and the RAB assignment request message carries a user plane IP address and TEID information allocated by the SGSN for receiving uplink data.

In Step 304b, the RNC allocates resources to the newly-established context and returns an RAB assignment response message.

The RAB assignment response message carries a user plane IP address and GTP TEID information allocated by the RNC for receiving downlink data and an approved QoS.

In Step 305a, if the user plane is established by adopting the One Tunnel architecture or the SGSN determines that the QoS sent by the RNC via the RAB assignment response message is different from the QoS returned by the GGSN via the create PDP context response message, the SGSN needs to initiate an update PDP context request to the GGSN.

If the user plane is established by adopting the One Tunnel architecture, the update PDP context request message carries the user plane IP address and the GTP TEID information allocated by the RNC for receiving downlink data and an indication that the user plane adopts the One Tunnel architecture, i.e., a One Tunnel flag. If the two QoSs are different, the update PDP context request message carries the QoS returned by the RNC.

In Step 305b, the GGSN updates corresponding information in the PDP context according to the received update PDP context request message and returns an update PDP context response message.

After receiving the update PDP context response message, the SGSN updates the corresponding PDP context according to information carried in the update PDP context response message. Here, if the user plane is established by adopting the One Tunnel architecture, the GGSN also saves a flag in the successfully created PDP context to indicate that the user plane is established by adopting the One Tunnel architecture.

In Step 306, the SGSN delivers an activate PDP context accept message to the MS. The activate PDP context accept message carries the IP address allocated by the GGSN and a QoS finally determined through negotiation.

Figure 4:
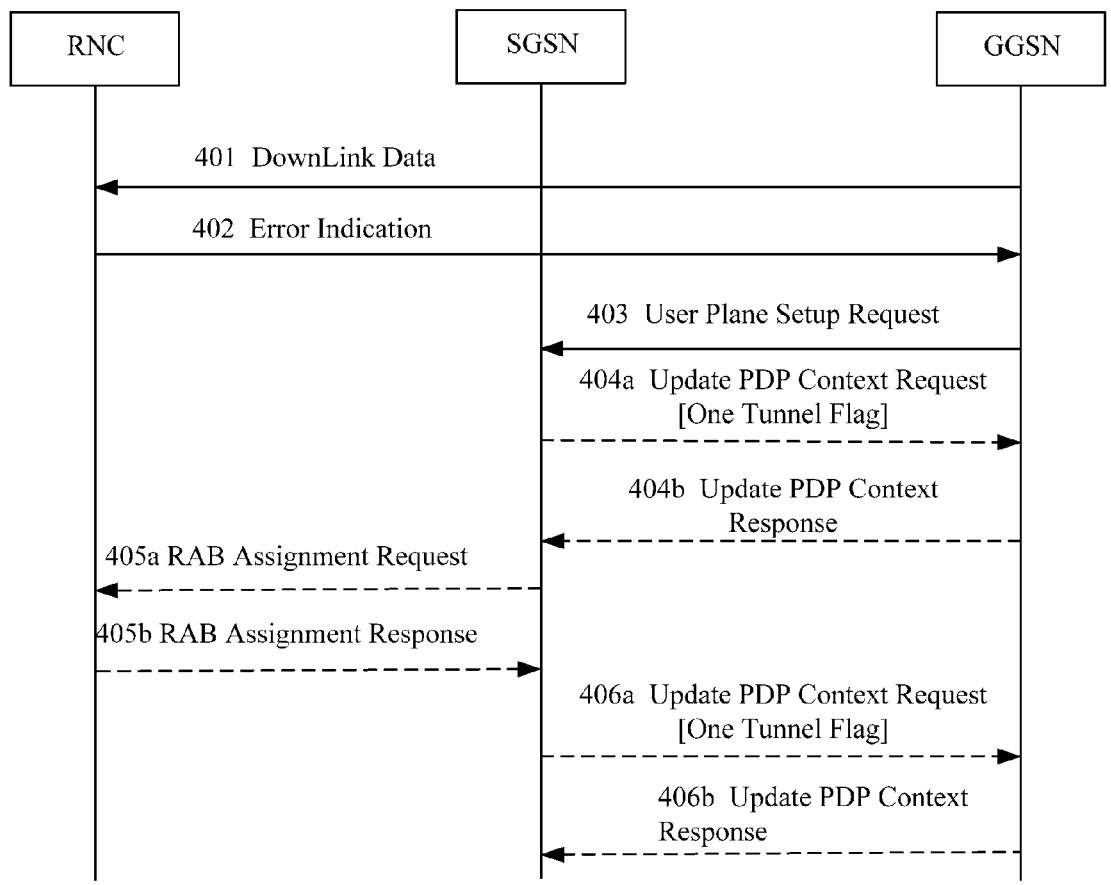
FIG. 4 is a flow chart of processing an invalidation of a downlink data tunnel of a user plane in the method according to the first preferred embodiment of the present invention.

After the IP bearer is established through the flow shown in FIG. 3, FIG. 4 is a flow chart of processing an invalidation of a downlink data tunnel of a user plane in the method according to the first preferred embodiment of the present invention. As shown in FIG. 4, the flow specifically includes the following steps.

In Step 401, after receiving a downlink data message of a user, a GGSN locates a corresponding PDP context, performs a GTP encapsulation on the downlink data message to form a downlink GTP data packet, and then sends the downlink GTP data packet to a corresponding GTP tunnel according to stored routing information in the PDP context.

In Step 402, an RNC receives the downlink GTP data packet, fails to locate a user plane context, and returns an error indication message to a source end of a GTP tunnel that sends the downlink GTP data packet.

In Step 403, the GGSN receives the error indication message returned by the RNC, and sends a user plane setup request to a corresponding SGSN according to information about the SGSN included in the control plane information stored in the PDP context, after determining that the corresponding PDP context adopts the One Tunnel architecture to establish a user plane.

Here, if the GGSN receives the error indication message returned by the RNC and determines that the corresponding PDP context does not adopt the One Tunnel architecture to establish the user plane, the GGSN directly releases the PDP context.

In Step 404a, after receiving the user plane setup request, the SGSN allocates a user plane IP address and a GTP TEID for receiving downlink data, carries the allocated information in an update PDP context request message, and sends the update PDP context request message to the GGSN.

Meanwhile, the message indicates that the PDP context does not adopt the One Tunnel architecture to establish the user plane.

Here, the SGSN sends the update PDP context request message to the GGSN, which aims at establishing a GTP tunnel between the SGSN and the GGSN. Thus, the update PDP context request message indicates that the PDP context does not adopt the One Tunnel architecture to establish the user plane.

In Step 404b, the GGSN updates the corresponding PDP context according to the information carried in the update PDP context request message, updates the downlink user plane GTP tunnel from the tunnel between the GGSN and the RNC to a tunnel between the GGSN and the SGSN, and returns an update PDP context response message to the SGSN.

Afterwards, the GGSN forwards received downlink user data to the SGSN via the updated GTP tunnel between the GGSN and the SGSN, and the SGSN buffers the downlink data forwarded by the GGSN.

In Step 405a, the SGSN initiates an RAB assignment process to the RNC, i.e., send an RAB assignment request message to the RNC, after receiving the user plane setup request from the GGSN or receiving the downlink data forwarded by the GGSN via the updated GTP tunnel.

The RAB assignment request message carries a user plane IP address and GTP TEID information allocated by the GGSN for receiving uplink data that are recorded in the PDP context of the SGSN.

If the SGSN does not receive the user plane setup request from the GGSN or the downlink data forwarded by the GGSN, the flow ends.

In Step 405b, the RNC returns an RAB assignment response message.

The message carries a user plane IP address and GTP TEID information allocated by the RNC for receiving downlink data or further carries a QoS and other tunnel resource information. If the SGSN has buffered some data, the SGSN delivers the data to the RNC according to the tunnel resource information designated by the information returned by the above RNC.

In Step 406a, the SGSN sends an update PDP context request message to the GGSN.

The update PDP context request message carries the user plane IP address and the GTP TEID information allocated by the RNC for receiving downlink data and an indication that the user plane adopts the One Tunnel architecture. In addition, if the QoS returned by the RNC is different from a corresponding QoS from the GGSN, the update PDP context request message further carries the QoS returned by the RNC.

In Step 406b, the GGSN updates the corresponding information in the PDP context according to the update PDP context request message, updates the tunnel between the GGSN and the SGSN back to a tunnel between the GGSN and the RNC, and returns an update PDP context response message to the SGSN.

After the flow shown in FIG. 4 is accomplished, the downlink data tunnel between the GGSN and the RNC is recovered, so that the data can be sent to the user via the downlink data tunnel.

Figure 5:
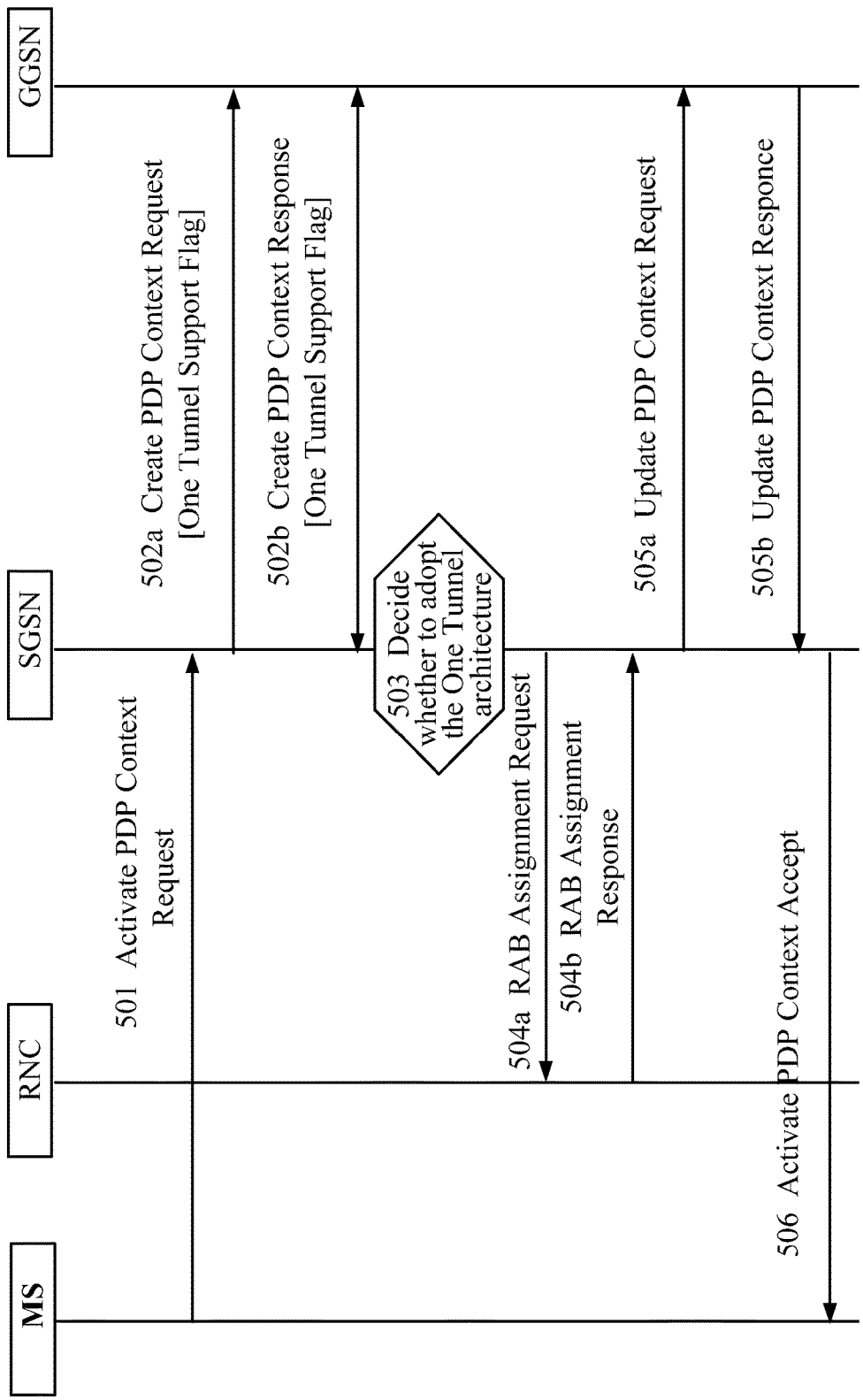
FIG. 5 is a flow chart of activating a PDP context by a user to establish an IP bearer in a method according to a second preferred embodiment of the present invention.

In a method according to a second preferred embodiment of the present invention, the complete One Tunnel scheme is adopted. FIG. 5 is a flow chart of activating a PDP context by a user to establish an IP bearer in a method according to a second preferred embodiment of the present invention. As shown in FIG. 5, the flow specifically includes the following steps.

In Step 501, an MS sends an activate PDP context request to an SGSN.

In Step 502a, the SGSN selects a GGSN and sends a create PDP context request message to the selected GGSN.

The create PDP context request message carries a permanent ID of the MS, a mobile phone number, a QoS requested by the MS, an APN requested to be activated, a user plane IP address and a GTP TEID allocated by the SGSN for receiving downlink data, an indication whether the SGSN supports a One Tunnel architecture, as well as other information.

In Step 502b, the GGSN creates a PDP context for the MS according to the information carried in the create PDP context request message and returns a create PDP context response message to the SGSN.

The create PDP context response message carries a negotiated QoS, a user plane IP address and GTP TEID information allocated by the GGSN for receiving uplink data, and an indication whether the GGSN supports the One Tunnel architecture.

In Step 503, if the SGSN determines that the SGSN itself and the GGSN both support the One Tunnel architecture, the SGSN decides to establish a user plane by adopting the One Tunnel architecture; otherwise, the One Tunnel architecture is not adopted when establishing the user plane.

In Step 504a, the SGSN delivers an RAB assignment request message to the RNC.

If the SGSN decides to establish the user plane by adopting the One Tunnel architecture, the RAB assignment request message carries the user plane IP address and the TEID information allocated by the GGSN for receiving uplink data; otherwise, a normal flow of establishing the user plane is performed, and the RAB assignment request message carries the user plane IP address and the TEID information allocated by the SGSN for receiving uplink data.

In Step 504b, after receiving the RAB assignment request message, the RNC allocates resources to the newly-established PDP context and returns an RAB assignment response message to the SGSN.

The RAB assignment response message carries a user plane IP address and GTP TEID information allocated by the RNC for receiving downlink data and an approved QoS.

In Step 505a, if the user plane is established by adopting the One Tunnel architecture or the QoS returned by the RNC is different from the corresponding QoS from the GGSN, the SGSN needs to send an update PDP context request message to the GGSN.

If the user plane is established by adopting the One Tunnel architecture, the update PDP context request message carries the user plane IP address and the GTP TEID information allocated by the RNC for receiving downlink data. If the QoS returned by the RNC is different from the QoS returned by the GGSN, the message carries the QoS returned by the RNC.

In Step 505b, the GGSN updates corresponding information in the PDP context according to the update PDP context request message and returns an update PDP context response message.

The GGSN can determine whether to adopt the One Tunnel architecture to establish the user plane according to the information whether the GGSN itself supports the One Tunnel architecture and the information whether the SGSN supports the One Tunnel architecture carried in the create PDP context request message from the SGSN in Step 502, and if the user plane is established by adopting the One Tunnel architecture here, a flag is saved in the successfully created PDP context to indicate that the user plane is established by adopting the One Tunnel architecture.

In Step 506, the SGSN delivers an activate PDP context accept message to the MS.

The message carries the IP address allocated to the user by the GGSN and a QoS finally determined through negotiation.

Figure 6:
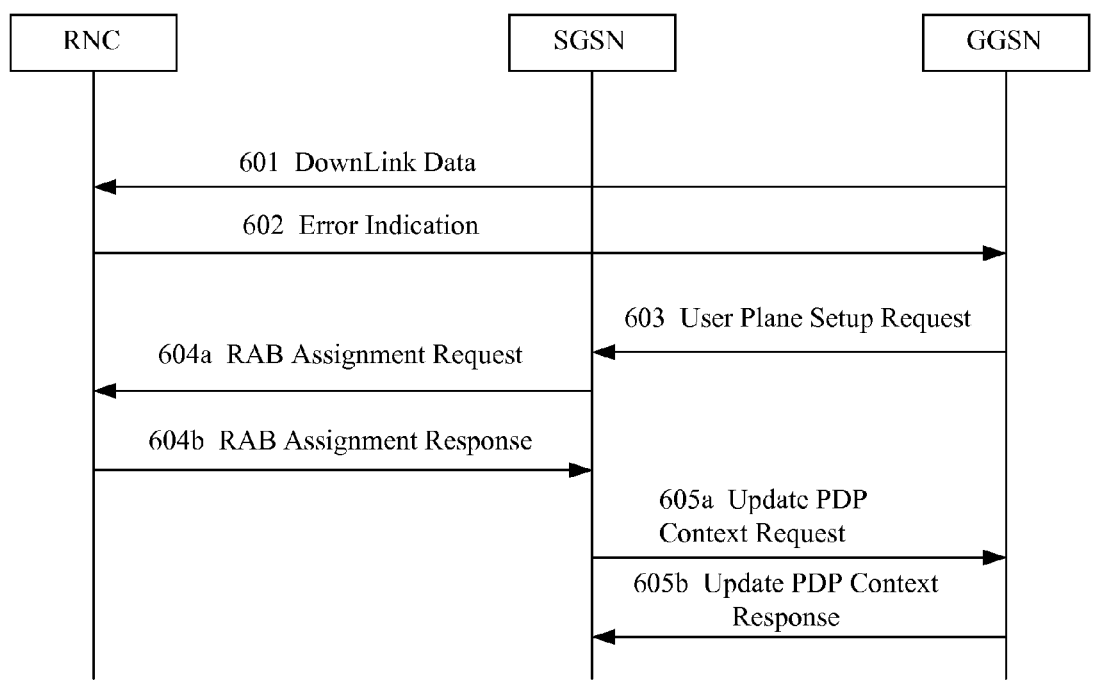
FIG. 6 is a flow chart of processing an invalidation of a downlink data tunnel of a user plane in the method according to the second preferred embodiment of the present invention.

After the IP bearer has been established, FIG. 6 is a flow chart of processing an invalidation of a downlink data tunnel of a user plane in the method according to the second preferred embodiment of the present invention. As shown in FIG. 6, the flow specifically includes the following steps.

In Step 601, after receiving a downlink data message of a user, a GGSN locates a corresponding PDP context, performs a GTP encapsulation on the downlink data message to form a downlink GTP data packet, and then sends the downlink GTP data packet to a corresponding GTP tunnel according to stored routing information in the PDP context.

In Step 602, an RNC receives a downlink GTP data packet, fails to locate a user plane context, and returns an error indication message to a source end of a GTP tunnel that sends the downlink GTP data packet.

In Step 603, the GGSN receives the error indication message returned by the RNC and sends a user plane setup request to a corresponding SGSN according to information about the SGSN included in the control plane information stored in the PDP context, after determining that the corresponding PDP context adopts the One Tunnel architecture to establish a user plane.

Here, if the GGSN receives the error indication message returned by the RNC and determines that the corresponding PDP context does not adopt the One Tunnel architecture to establish the user plane, the GGSN directly releases the PDP context.

In Step 604a, the SGSN initiates an RAB assignment process to the RNC, i.e., sends an RAB assignment request message to the RNC.

The RAB assignment request message carries a user plane IP address and GTP TEID information allocated by the GGSN for receiving uplink data that are recorded in the PDP context of the SGSN.

In Step 604b, the RNC returns an RAB assignment response message.

The RAB assignment response message carries a user plane IP address and GTP TEID information allocated by the RNC for receiving downlink data and an approved QoS.

In Step 605a, the SGSN sends an update PDP context request message to the GGSN.

The update PDP context request message carries the user plane IP address and the GTP TEID information allocated by the RNC for receiving downlink data. If the QoS returned by the RNC is different from the QoS from the GGSN, the message further carries the QoS returned by the RNC.

In Step 605b, the GGSN updates the corresponding information in the PDP context according to the update PDP context request message, updates a data tunnel between the GGSN and the SGSN back to a tunnel between the GGSN and the RNC, and returns an update PDP context response message.

Figure 7:
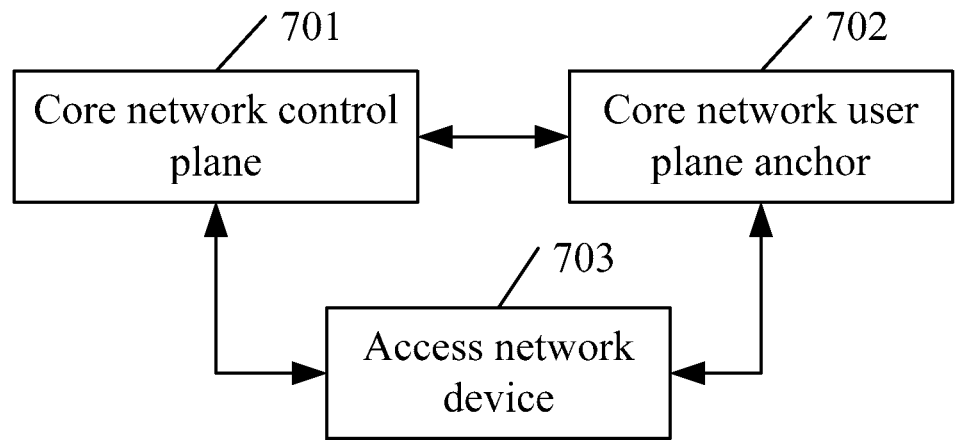
FIG. 7 is a schematic structural view of a system according to an embodiment of the present invention.

Based on the above method, FIG. 7 is a schematic structural view of a system according to an embodiment of the present invention. As shown in FIG. 7, the system includes a core network control plane 701 and a core network user plane anchor 702.

The core network user plane anchor 702 is adapted to receive an error indication of data tunnel from an access network device, and notify the core network control plane 701 to request recovering the downlink data tunnel, after determining that a user plane corresponding to the error indication uses a One Tunnel technology.

The core network control plane 701 is adapted to recover the downlink data tunnel and notify the core network user plane anchor 702 to update information of the user plane.

The system further includes an access network device 703 adapted to send the error indication of data tunnel to the core network user plane anchor 702 according to the determined invalidation information of the data tunnel, perform an RAB reestablishment according to a command from the core network control plane 701, and send RAB accomplishing information to the core network control plane 701.

In the actual applications, the core network control plane 701 may be an SGSN, the core network user plane anchor 702 may be a GGSN, and the access network device 703 may be an RNC.

The SGSN sends tunnel resource information allocated by the GGSN for receiving uplink data to the RNC and sends tunnel resource information allocated by the RNC for receiving downlink data to the GGSN.

The GGSN updates a PDP context according to the tunnel resource information allocated by the RNC for receiving the downlink data sent from the SGSN and recovers the downlink data tunnel between the GGSN and the RNC.

The RNC allocates the tunnel resource information for receiving the downlink data according to the received tunnel resource information allocated by the GGSN for receiving the uplink data sent from the SGSN and sends the tunnel resource information allocated by the RNC itself to the SGSN.

In the One Tunnel scheme in which the SGSN retains the user plane function, the SGSN further allocates tunnel resource information for receiving downlink data according to the tunnel resource information allocated by the GGSN for receiving the uplink data stored in the PDP context, establishes a data tunnel between the SGSN and the GGSN, and sends the buffered data received via the data tunnel between the SGSN and the GGSN to the RNC according to the tunnel resource information allocated by the RNC for receiving the downlink data.

During the process of activating the PDP context by the user, in the One Tunnel scheme in which the SGSN retains the user plane function, the SGSN may further decide whether to establish the user plane by adopting the One Tunnel architecture or not according to subscription information, a roaming status of the user, an indication whether the GGSN supports the One Tunnel architecture, and the like. In the complete One Tunnel scheme, the SGSN may decide whether to establish the user plane by adopting the One Tunnel architecture or not according to information whether the SGSN itself and the GGSN both support the One Tunnel architecture.

Figure 8:
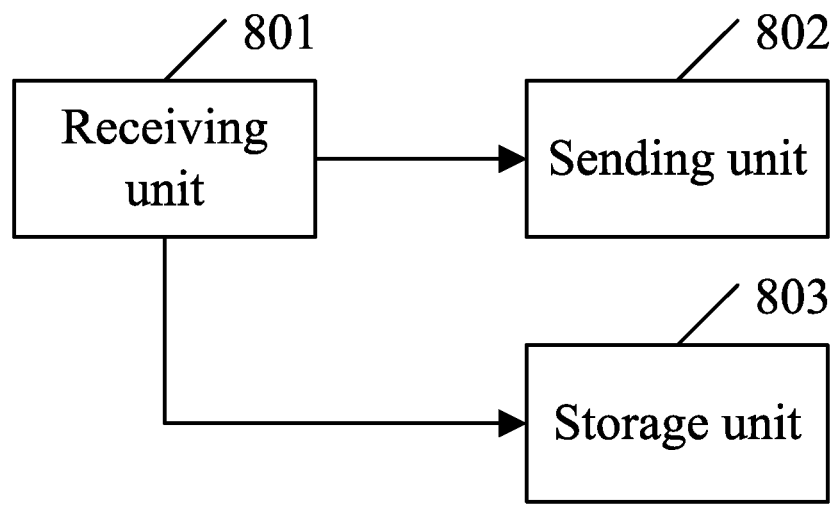
FIG. 8 is a schematic structural view of a device according to an embodiment of the present invention.

FIG. 8 is a schematic structural view of a device according to an embodiment of the present invention. As shown in FIG. 8, the device is a GGSN device and specifically includes a receiving unit 801 and a sending unit 802.

The receiving unit 801 is adapted to receive an error indication of data tunnel from an access network device.

The sending unit 802 is adapted to notify a core network control plane to request recovering the downlink data tunnel after determining that a user plane corresponding to the error indication uses a One Tunnel technology.

In addition, the device further includes a storage unit 803 adapted to update a PDP context according to tunnel resource information allocated by the access network device received by the receiving unit 801 from the core network control plane and recover the downlink data tunnel between the access network device and GGSN.

In the subsequent evolving 3GPP system, a control plane and a user plane of a core network are separated from each other. The core network has only one layer of user plane including a core network user plane entity (UPE) and an inter access system anchor (IASA), which are combined into one network entity called a core network user plane anchor in the future evolving network architecture. The UPE and the IASA are called at the early time of evolving 3GPP system and are replaced by Serving Gateway and PDN (Packet Data Networks) Gateway respectively recently, i.e., the UPE corresponds to the Serving Gateway and the IASA corresponds to the PDN Gateway. The specific functions of the core network user plane anchor are substantially the same as that performed by the above GGSN. The control plane of the core network, called an MME in the specification, is an independent entity, whose specific functions are substantially the same as that performed by the SGSN in the complete One Tunnel scheme. In addition, in the subsequent evolving 3GPP system, an E-NodeB realizes the functions of the above RNC. Therefore, the above method and system on the present invention are not only applicable to the One Tunnel architecture of the 3GPP system prior to the Rel7, but also applicable to the above evolving 3GPP system. After the present invention is applied to the 3GPP system, the function performed by the core network user plane anchor which has the UPE and IASA functions about recovering the downlink data tunnel is similar to that of the GGSN. The function performed by the core network control plane about recovering the downlink data tunnel is similar to that of the SGSN, and the function performed by the E-NodeB about recovering the downlink data tunnel is similar to that of the RNC. The specific signaling names may be different from the above second embodiment, but the specific processing flows are substantially the same, which thus will not be described herein again.

It will be apparent to those skilled in the art from the above detailed descriptions that the present invention can be implemented by means of software plus a necessary universal hardware platform, which definitely can also be implemented by hardware. However, in most cases, the former is a preferable implementation. Accordingly, the technical solutions of the present invention in essence or a part of the technical solutions that makes contributions to the existing systems may be embodied in the form of a software product. The computer software product is stored in a storage medium and includes several instructions to enable a computer device (may be a personal computer, a server, or a network device) to implement the methods according to the embodiments of the present invention.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the scope of the present invention and covered in the claims of the present invention.

What is claimed is:

1. A method for radio access bearer (RAB) assignment, comprising:

sending, by a core network control plane, a RAB assignment request to an access network device, the RAB assignment request carrying a user plane internet protocol (IP) address and tunnel end identity (TEID) information that are allocated by a core network user plane anchor for receiving uplink data;

receiving, by the core network control plane, a RAB assignment response from the access network device;

sending, by the core network control plane, an update packet data protocol (PDP) context request to the core network user plane anchor, the update PDP context request including a direct tunnel flag; and receiving, by the core network control plane, an update PDP context response from the core network user plane anchor.

2. The method according to claim 1, before sending, by the core network control plane, the RAB assignment request to the access network device, further comprising:

receiving, by the core network control plane, an instruction from the core network user plane anchor to recover a downlink data tunnel.

3. The method according to claim 1, further comprising: sending, by the access network device, the RAB assignment response to the core network control plane, wherein the RAB assignment response includes a user plane IP address and TEID information that are allocated by the access network device for receiving downlink data.

4. The method according to claim 1, wherein the update PDP context request includes a user plane IP address and TED information that are allocated by the access network device for receiving downlink data.

5. The method according to claim 1, further comprising:

receiving, by the core network user plane anchor, the update PDP context request from the core network control plane;

updating, by the core network user plane anchor, a corresponding PDP context response according to the update PDP context request; and sending, by the core network user plane anchor, the update PDP context response to the core network control plane.

6. The method according to claim 1, wherein the update PDP context response includes a user plane IP address and TEID information that are allocated by the core network user plane anchor for receiving uplink data.

7. The method according to claim 1, wherein, the RAB assignment response from the access network device includes information about a quality of service (QoS), the method further comprising:

sending, by the core network control plane to the core network user plane anchor, a message including the information about the QoS from the RAB assignment response.

8. A communication device, comprising:

a transmitter configured to send a radio access bearer (RAB) assignment request to an access network device, the RAB assignment request including a user plane internet protocol (IP) address and tunnel end identity (TEID) information that are allocated by a core network user plane anchor for receiving uplink data;

a receiver configured to receive a RAB assignment response from the access network device;

the transmitter is further configured to send an update packet data protocol (PDP) context request to the core network user plane anchor, the update PDP context request including a direct tunnel flag; and the receiver is further configured to receive an update PDP context response from the core network user plane anchor.

9. The communication device according to claim 8, wherein before the transmitter sends the RAB assignment request to the access network device, the receiver is configured to receive an instruction from the core network user plane anchor to recover a downlink data tunnel.

10. The communication device according to claim 8, wherein the RAB assignment response includes a user plane IP address and TED information that are allocated by the access network device for receiving downlink data.

11. The communication device according to claim 8, wherein after the receiver receives the RAB assignment response from the access network device, the transmitter is configured to send an update packet data protocol (PDP) context request to the core network user plane anchor.

12. The communication device according to claim 11, wherein the update PDP context request includes a user plane IP address and TED information that are allocated by the access network device for receiving downlink data.

* * * * *